United States Patent
Kwon

(10) Patent No.: US 11,996,594 B2
(45) Date of Patent: May 28, 2024

(54) SELF-CONTAINED HYDROGEN POWER SYSTEM FOR SMART FARM

(71) Applicant: KWaterCraft Co., Ltd., Busan (KR)

(72) Inventor: Soon Pyo Kwon, Busan (KR)

(73) Assignee: KWATERCRAFT CO., LTD., Busan (KR)

( * ) Notice: Subject to any disclaimer, the term of this patent is extended or adjusted under 35 U.S.C. 154(b) by 433 days.

(21) Appl. No.: 17/444,631

(22) Filed: Aug. 6, 2021

(65) Prior Publication Data

US 2023/0044548 A1 Feb. 9, 2023

(51) Int. Cl.
| | |
|---|---|
| G06V 10/00 | (2022.01) |
| A01K 61/17 | (2017.01) |
| A01K 61/80 | (2017.01) |
| A01K 63/04 | (2006.01) |
| C25B 1/04 | (2021.01) |
| H01M 8/0656 | (2016.01) |
| A01K 61/10 | (2017.01) |

(52) U.S. Cl.
CPC .......... H01M 8/0656 (2013.01); A01K 61/17 (2017.01); A01K 61/80 (2017.01); A01K 63/042 (2013.01); C25B 1/04 (2013.01); A01K 61/10 (2017.01); H01M 2250/10 (2013.01)

(58) Field of Classification Search
CPC .......... H01M 8/0656; H01M 8/04201; H01M 16/003; H01M 2250/10; G01F 5/02; C25B 1/04; C25B 1/26; C25B 15/00; C25B 15/02; C02F 1/46104; B63H 21/17; A01K 61/80; A01K 61/10; A01K 61/17; A01K 63/042; G01N 21/84; A01G 9/243
See application file for complete search history.

(56) References Cited

U.S. PATENT DOCUMENTS

| | | | | |
|---|---|---|---|---|
| 8,119,297 B2* | 2/2012 | Kwon | ............... | H01M 16/006 429/429 |
| 9,156,714 B2* | 10/2015 | McCluskey | .......... | B01D 61/025 |
| 9,252,442 B2* | 2/2016 | Jeon | ................ | H01M 8/04589 |
| 2016/0028236 A1* | 1/2016 | Lansing, Jr. | ............... | F03D 9/11 307/65 |
| 2016/0076509 A1* | 3/2016 | Im | ...................... | H01M 8/0656 60/398 |
| 2020/0113158 A1* | 4/2020 | Rishi | .................... | A01K 61/60 |

(Continued)

OTHER PUBLICATIONS

Tsuji et al., "EP3780313A1 Energy management device, hydrogen utilization system, program, and energy management method"; Filing Date: Mar. 30, 2018.*

(Continued)

*Primary Examiner* — Amir Alavi

(74) *Attorney, Agent, or Firm* — Boisbrun Hofman, PLLC

(57) ABSTRACT

Disclosed are a system and method for managing a self-contained hydrogen power system for a smart farm. The system may include a self-contained hydrogen generation unit configured to purify intake-water, generate clean hydrogen through water electrolysis, generate energy through a fuel cell by using the generated clean hydrogen, and store the energy, and a farm environment control unit configured to receive, from the self-contained hydrogen generation unit, energy for driving a plurality of sensors and devices for producing aquatic products and control an environment for producing aquatic products.

8 Claims, 7 Drawing Sheets

(56) References Cited

U.S. PATENT DOCUMENTS

| | | | |
|---|---|---|---|
| 2022/0090272 A1* | 3/2022 | Kwon | ............... C25B 15/02 |
| 2022/0190372 A1* | 6/2022 | Kwon | ............... H02S 40/30 |
| 2023/0040981 A1* | 2/2023 | Kwon | ............... B60L 53/54 |
| 2023/0042523 A1* | 2/2023 | Kwon | ............... G01N 21/84 |
| 2023/0044548 A1* | 2/2023 | Kwon | ............ H01M 8/0656 |

OTHER PUBLICATIONS

Kwon et al., "CN112344508A Energy self-sufficient type water electrolysis fuel cell pure water air purification system"; Filing Date: Aug. 28, 2019.*

* cited by examiner

SELF-CONTAINED HYDROGEN POWER SYSTEM FOR SMART FARM

TECHNICAL FIELD

The present disclosure relates to a self-contained hydrogen power system for a smart farm.

BACKGROUND OF THE INVENTION

As the era of the fourth industrial revolution elapses and IT technologies are converged regardless of the type of business, a farm is also developed into a smart farm. As the population of seaside towns is reduced and aging continues, at timing at which earnings are stalled, a movement to increase fishery productivity through the convergence of IT technologies in various fields is actively started, and thus the smart farm is activated. The smart farm can increase efficiency and convenience of production because a growing environment for aquatic products can be properly maintained and managed through the construction and operation of an integrated monitoring system using a smartphone application or a PC and the system can be remotely managed. However, with the development of the smart farm, power consumption is increased and it is difficult to supply power adrift. Accordingly, there is a need for a technology capable of producing energy eco-friendly and independently.

SUMMARY

This summary is provided to introduce a selection of concepts in a simplified form that are further described below in the Detailed Description. This summary is not intended to identify key features of the claimed subject matter, nor is it intended to be used as an aid in determining the scope of the claimed subject matter.

An object of the present disclosure is to provide a self-contained hydrogen power system for a smart farm, wherein hydrogen is produced through a water electrolysis device without external power by using sunlight and water received from a coast and a river, the produced hydrogen is produced as energy through a fuel cell, and the produced energy is stored in a battery or power is supplied to the controller of a smart farm in order to produce aquatic products.

In an aspect, a system for managing a smart farm includes a self-contained hydrogen generation unit configured to purify intake-water, generate clean hydrogen through water electrolysis, generate energy through a fuel cell by using the generated clean hydrogen, and store the energy, and a farm environment control unit configured to receive, from the self-contained hydrogen generation unit, energy for driving a plurality of sensors and devices for producing aquatic products and control a smart farm environment for producing aquatic products.

The self-contained hydrogen generation unit includes a water-intake and high-level water purification unit configured to retain the intake-water in a water reserve tank and perform water treatment on the intake-water by removing precipitates, a solar water electrolysis unit configured to receive the purified water, generate hydrogen through water electrolysis by using energy generated by a sunlight collector, and then purify and store the generated hydrogen, and an energy production and storage unit configured to receive the stored hydrogen, generate energy through the fuel cell by using the energy generated by the sunlight collector, and store the produced energy in an energy storage device, wherein the stored energy is also used to supply power to a solar water electrolysis unit.

The farm environment control unit monitors the smart farm environment through the plurality of sensors, and controls the smart farm environment for producing aquatic products by using a plurality of devices, including an intelligent auto-feed supplier, a breeding environment controller, a net cleaner, a farm environment measurement sensor, a fish body measurement sensor, and a CCTV image managing device, based on the monitored farming environment, wherein oxygen left after hydrogen is produced through water electrolysis in the self-contained hydrogen generation unit is supplied to the smart farm in order to increase the amount of dissolved oxygen, and a filter comprising carbon and zeolite is attached to an oxygen outlet in order to remove harmful gas.

The self-contained hydrogen generation unit and the farm environment control unit may be monitored through a mobile or a web and perform remote machine control, including the supply of water, the adjustment of a water level in the reserve tank, the adjustment of an electrolyte concentration for water electrolysis, intelligent auto-feed supply, control of a breeding environment, the cleaning of a net, control of the smart farm environment, the measurement of a fish body, and the management of CCTV images, based on a result of the monitoring, and may remotely control power in order to increase lifespan of the energy production and storage unit and for an operation using external power when the driving of water electrolysis is stopped or when the driving of a fuel cell is stopped or when self-power production is stopped by introducing external power.

The energy production and storage unit recovers hydrogen left after the hydrogen is converted into the energy through the fuel cell by using the energy generated by the sunlight collector and injects the recovered hydrogen into the fuel cell again through the hydrogen purification device. The fuel cell has a dual engine structure in which a plurality of fuel cells is connected in parallel and has a charging/discharging switching structure in order to enhance lifespan of the energy storage device.

In another aspect, a method of managing a smart farm includes steps of purifying, by a self-contained hydrogen generation unit, intake-water, generating clean hydrogen through water electrolysis, generating energy through a fuel cell by using the generated clean hydrogen, and storing the energy; and receiving, by a farm environment control unit, energy for driving a plurality of sensors and devices for producing aquatic products from the self-contained hydrogen generation unit and controlling a smart farm environment for producing aquatic products.

According to embodiments of the present disclosure, the self-contained hydrogen power system for a smart farm can produce hydrogen through the water electrolysis device without external power by using sunlight and water received from a coast and a river, can produce the produced hydrogen as energy through the fuel cell, and can store the produced energy in the battery or supply power to the controller of the smart farm in order to produce aquatic products.

DESCRIPTION OF THE DRAWINGS

The foregoing aspects and many of the attendant advantages of this invention will become more readily appreciated as the same become better understood by reference to the following detailed description, when taken in conjunction with the accompanying drawings, wherein.

DETAILED DESCRIPTION

While illustrative embodiments have been illustrated and described, it will be appreciated that various changes can be made therein without departing from the spirit and scope of the invention.

Hereinafter, embodiments of the present disclosure are described in detail with reference to the accompanying drawings.

Figure 1:
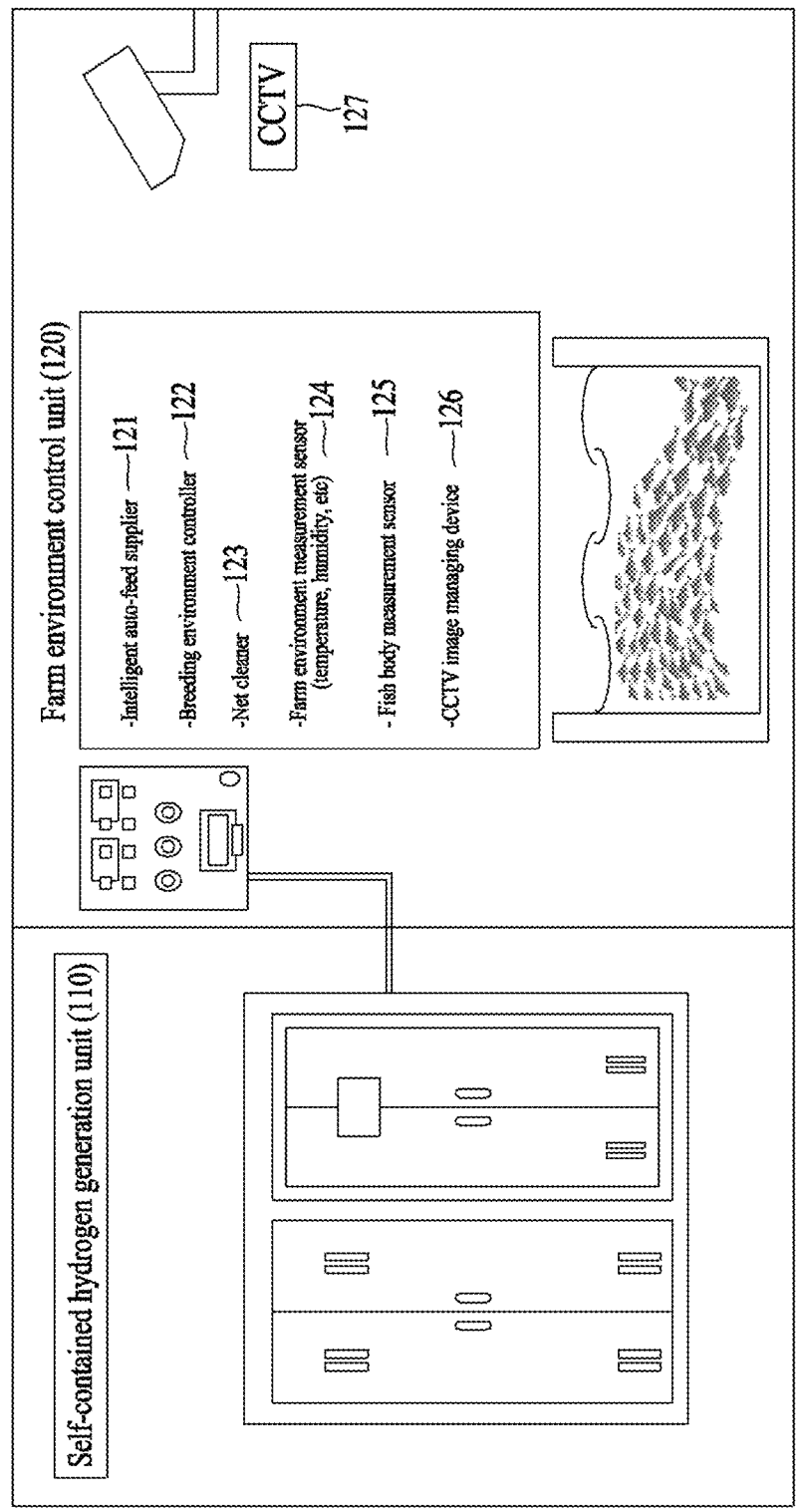
FIG. 1 is a diagram illustrating a configuration of a system for managing a self-contained hydrogen power system for a smart farm according to an embodiment of the present disclosure.

FIG. 1 is a diagram illustrating a configuration of a system for managing a self-contained hydrogen power system for a smart farm according to an embodiment of the present disclosure.

The present disclosure proposes a self-contained hydrogen power system for a smart farm in order to overcome regional limitations in restricted power supply in installing and operating a smart farm for increasing farm productivity and profits of a fishing village. A proposed system for managing the self-contained hydrogen power system for a smart farm includes a self-contained hydrogen generation unit 110 and a farm environment control unit 120.

The self-contained hydrogen generation unit 110 according to an embodiment of the present disclosure purifies intake-water, generates clean hydrogen through water electrolysis, generates energy through a fuel cell by using the generated clean hydrogen, and stores the energy.

For example, the self-contained hydrogen generation unit 110 is an integrated system for producing hydrogen through a water electrolysis device without external power by using sunlight and water received from a coast and a river, converting the produced hydrogen into energy through the fuel cell, and storing the produced energy in an energy storage device (i.e., a battery) or directly supplying power to the farm environment control unit 120 of a smart farm in order to produce aquatic products.

The present disclosure includes a smart energy IT system for securing commercial viability and reliability of a smart farm by checking the amount of power necessary for the smart farm, the stability and state of the system, etc.

The farm environment control unit 120 according to an embodiment of the present disclosure receives, from the self-contained hydrogen generation unit, energy for driving a plurality of sensors, a camera (CCTV) 127, and devices for producing aquatic products, for example an intelligent auto-feed supplier 121, a breeding environment controller 122, a net cleaner 123, a farm environment measurement sensor 124, a fish body measurement sensor 125, and a CCTV image managing device 126, and controls an environment for producing aquatic products. Furthermore, oxygen left after hydrogen is produced through water electrolysis in the self-contained hydrogen generation unit is supplied to the smart farm in order to increase the amount of dissolved oxygen, and a filter comprising carbon and zeolite is attached to an oxygen outlet in order to remove harmful gas.

In a space for producing aquatic products according to an embodiment of the present disclosure, a smart farm can be operated in a self-contained manner anywhere in an isolated region and a rural area where power supply is not smooth by driving the farm environment control unit by using power supplied through a self-contained hydrogen generation unit.

The farm environment control unit 120 monitors a farming environment through the plurality of sensors and the camera 127, and controls a smart farm environment for producing aquatic products based on the monitored farming environment.

The farming environment measured by the plurality of sensors is monitored through a mobile or a web. The supply of water, the adjustment of a water level in a reserve tank, and the adjustment of an electrolyte concentration for water electrolysis by the self-contained hydrogen generation unit can be controlled based on a result of the monitoring. Furthermore, intelligent auto-feed supply, a breeding environment, the cleaning of a net, a farm environment, the measurement of a fish body, and the management of CCTV images in the farming environment can be controlled. The farm environment control unit 120 can construct an optimum farming environment based on fish species by variously adjusting an environment and the type of sensor depending on breeding fish species. Such control can be manually performed by displaying a monitored result on a display or can be performed through remote machine control through a mobile or a web.

Hereinafter, a configuration of the self-contained hydrogen generation unit according to an embodiment of the present disclosure is more specifically described with reference to FIG. 2.

Figure 2:
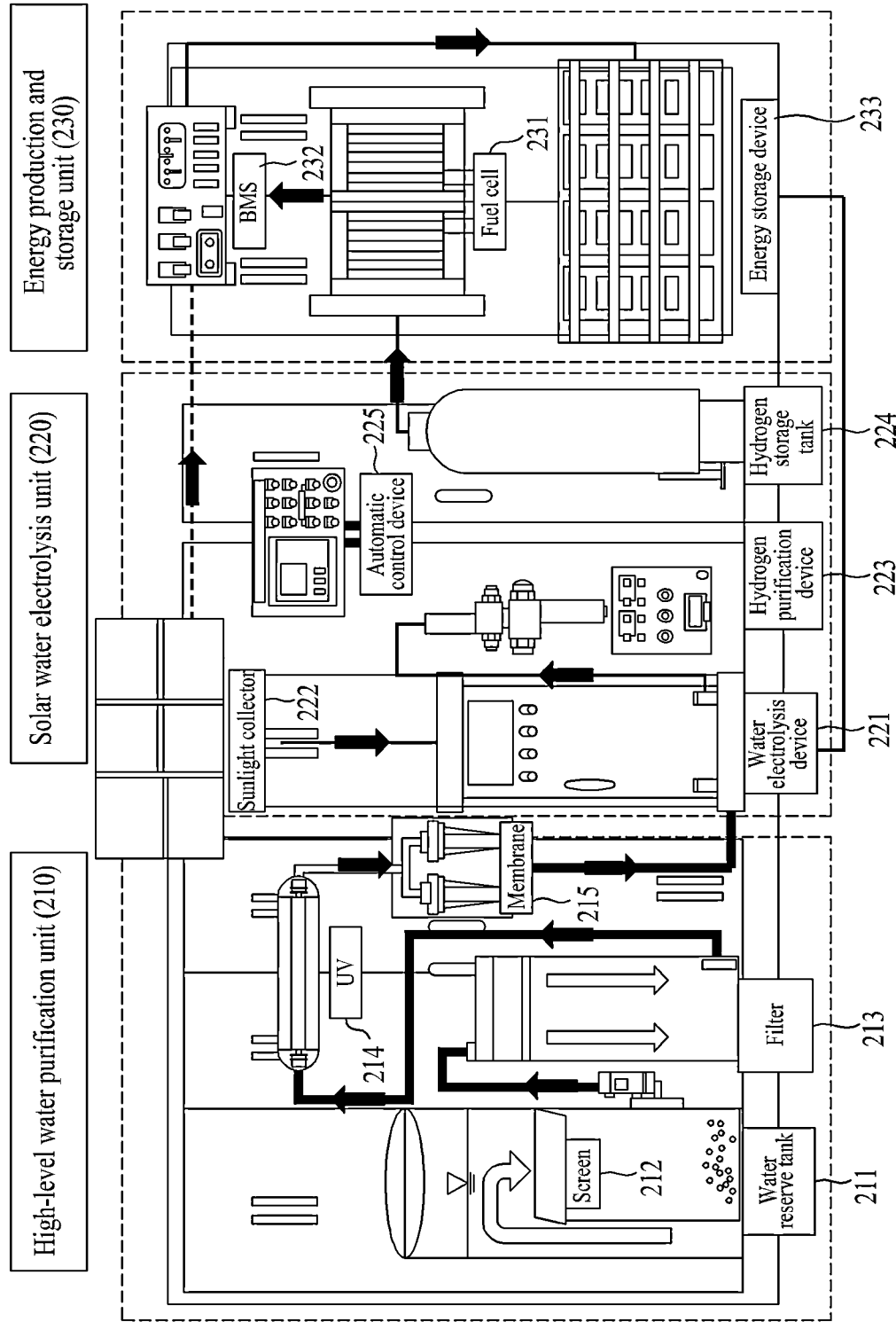
FIG. 2 is a diagram illustrating a configuration of a self-contained hydrogen generation unit according to an embodiment of the present disclosure.

FIG. 2 is a diagram illustrating a configuration of a self-contained hydrogen generation unit according to an embodiment of the present disclosure.

The self-contained hydrogen generation unit includes a water-intake and high-level water purification unit 210, a solar water electrolysis unit 220 and an energy production and storage unit 230.

The water-intake and high-level water purification unit 210 retains intake-water in a water reserve tank and performs water treatment on the water by removing precipitates. In the water-intake and high-level water purification unit 210, first, storm water, seawater or portable water is retained in a water reserve tank 211, and precipitates are filtered out from the storm water, seawater or portable water. The storm water, seawater or portable water is primarily filtered through a screen 212 within the water reserve tank 211. Thereafter, the filtered water is secondarily filtered through a filter 213 and then thirdly filtered and purified through UV 214 and a membrane filter 215. The purified water is designed to be supplied to the solar water electrolysis unit 220 and to also be used as drinking water.

Emphasis has been placed on a treatment process for each water use. The treatment process is performed through consecutive processes, including sedimentation, filtration, activated carbon adsorption, reverse osmosis, and high oxidation. A reactor is designed by considering a treatment level of a target value, an optimum injection concentration, light intensity, a contact time, and a characteristic for each water quality factor. Furthermore, system performance can be maintained with high efficiency for a long time by making, as a manual, timing at which an individual unit element system is controlled, maintained and managed for each processing target material.

The solar water electrolysis unit 220 receives the purified water, generates hydrogen through water electrolysis by using energy generated by a sunlight collector, and purifies and then stores the generated hydrogen.

The purified water is introduced into the solar water electrolysis unit 220 and subjected to water electrolysis, thereby generating clean hydrogen. The water electrolysis process is efficiently performed using solar thermal energy collected by a sunlight collector 222. Hydrogen generated by a water electrolysis device 221 by using solar thermal energy and water is converted into high-purity clean hydrogen through a purification process in a hydrogen purification device 223, and is then stored in a hydrogen storage tank 224. Thereafter, an automatic control device 225 periodically injects a given amount of hydrogen into the energy production and storage unit 230. Upon water electrolysis, the automatic control device 225 efficiently controls required power versus solar power generation efficiency by analyzing the required power versus solar power generation efficiency.

The stored hydrogen is injected into the energy production and storage unit 230. The energy production and storage unit 230 generates energy through a fuel cell 231 by using energy generated by the sunlight collector, and stores the produced energy into an energy storage device 233. The stored energy is used to additionally supply sufficient power to the water electrolysis device.

The fuel cell 231 converts, into energy, the hydrogen injected into the energy production and storage unit 230. The produced energy and the energy generated by the sunlight collector 222 are transferred to a battery management system (BMS) 232. An optimum energy production and storage process is performed through interoperation between the BMS 232 and the automatic control device 225. Power generated through a stack of the fuel cells is stored in the energy storage device 233, and may be used as emergency power.

The energy production and storage unit 230 may evaluate, through a panel, a storage state of dump power produced by the fuel cell 231, and adopts a bidirectional power conditioning system (PCS) for converting, into AC, power produced as DC and storing the AC.

The energy production and storage unit 230 may recover hydrogen left after energy is converted into hydrogen through the fuel cell 231 by using the energy generated by the sunlight collector 222, may purify the recovered hydrogen through the hydrogen purification device 223, and may inject the purified hydrogen into the fuel cell 231 again. The fuel cell 231 may have a dual engine structure in which a plurality of fuel cells is connected in parallel. The energy storage device 233 may have a charging/discharging switching structure in order to enhance lifespan.

According to an embodiment of the present disclosure, the self-contained hydrogen generation unit can be monitored through a mobile or a web, and can enable remote machine control, including the supply of water, the adjustment of a water level in the reserve tank, and the adjustment of an electrolyte concentration for water electrolysis, based on a result of the monitoring. Furthermore, power of the self-contained hydrogen generation unit can be remotely controlled in order to increase the lifespan of the battery and to be operated by introducing external power when the driving of water electrolysis in the fuel cell is stopped or when self-power production is stopped.

Figure 3:
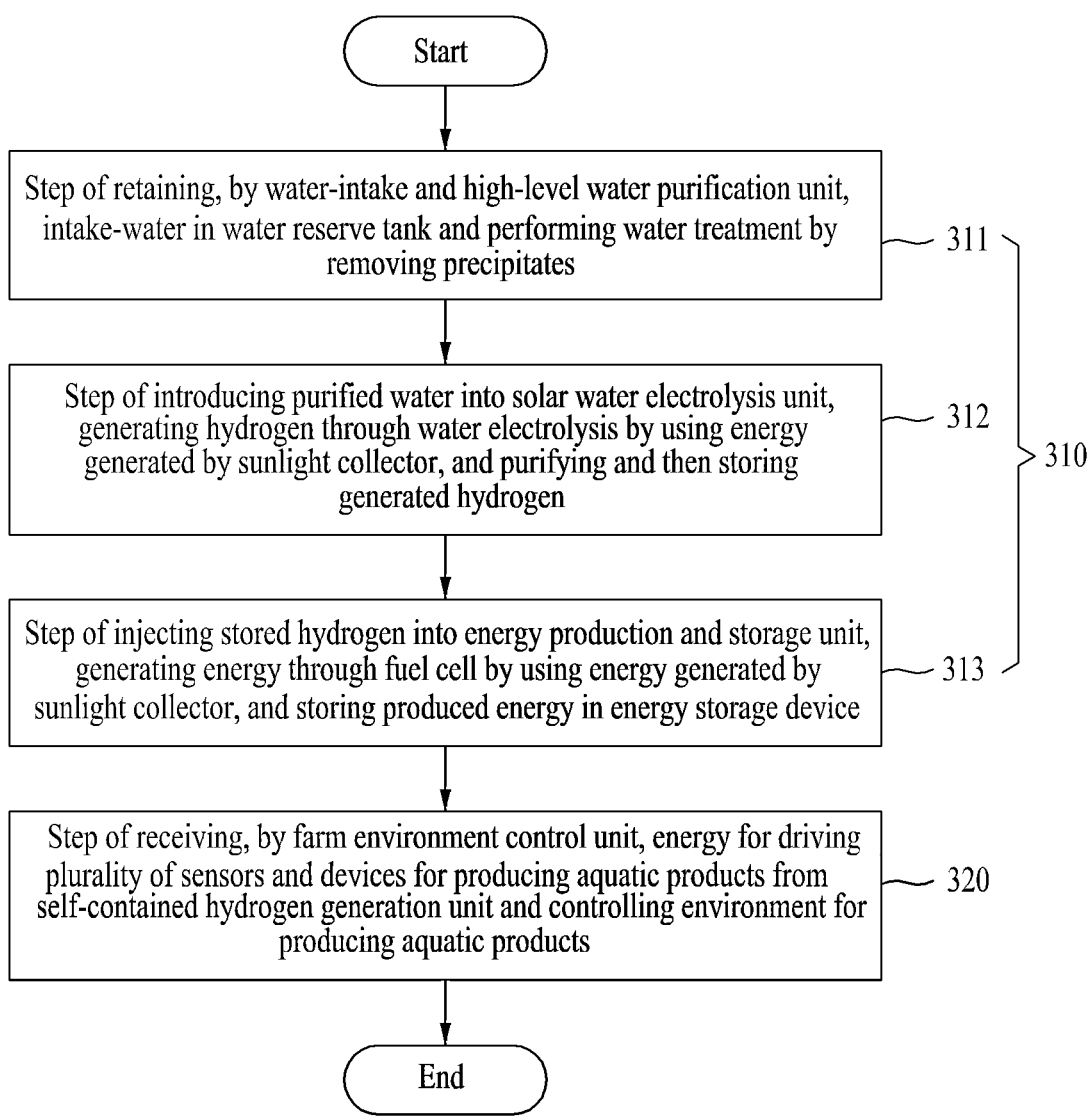
FIG. 3 is a flowchart for describing a method of managing the self-contained hydrogen power system for a smart farm according to an embodiment of the present disclosure.

FIG. 3 is a flowchart for describing a method of managing the self-contained hydrogen power system for a smart farm according to an embodiment of the present disclosure.

A proposed method of managing the self-contained hydrogen power system for a smart farm includes step 310 of purifying, by the self-contained hydrogen generation unit, intake-water, generating clean hydrogen through water electrolysis, generating energy through the fuel cell by using the generated clean hydrogen, and storing the energy, and step 320 of receiving, by the farm environment control unit, energy for driving the plurality of sensors and the devices for producing aquatic products from the self-contained hydrogen generation unit and controlling an environment for producing aquatic products.

In step 310, the self-contained hydrogen generation unit purifies intake-water and generates clean hydrogen through water electrolysis. Energy is generated and stored through the fuel cell by using the generated clean hydrogen. The stored energy is used to additionally supply sufficient power to the water electrolysis device.

For example, the self-contained hydrogen generation unit produces hydrogen through the water electrolysis device without external power by using sunlight and water received from a coast and a river. The produced hydrogen is converted into energy through the fuel cell. The produced energy is stored in the energy storage device (i.e., the battery) or directly supplied to the farm environment control unit of a smart farm in order to produce aquatic products.

Step 310 includes step 311 of retaining, by the water-intake and high-level water purification unit, intake-water in the water reserve tank and performing water treatment by removing precipitates, step 312 of introducing the purified water into the solar water electrolysis unit, generating hydrogen through water electrolysis by using energy generated by the sunlight collector, and purifying and then storing the generated hydrogen, and step 313 of injecting the stored hydrogen into the energy production and storage unit, generating energy through the fuel cell using the hydrogen produced through water electrolysis by using the energy generated by the sunlight collector, and storing the produced energy in the energy storage device.

In step 311, water received through the water-intake and high-level water purification unit is retained in the water reserve tank. Water treatment is performed on the water by removing precipitates. The water-intake and high-level water purification unit retains in the intake-water in the water reserve tank, and perform water treatment on the water by removing precipitates. The water-intake and high-level water purification unit first retains storm water, seawater or portable water in the water reserve tank and filters out precipitates from the water. The water is primarily filtered through a screen within the water reserve tank. Thereafter, after secondarily filtered through the filter, the filtered is thirdly filtered and purified through the UV and the membrane filter.

Emphasis has been placed on a treatment process for each water use. The treatment process is performed through consecutive processes, including sedimentation, filtration, activated carbon adsorption, reverse osmosis, and high oxidation. The reactor is designed by considering a treatment level of a target value, an optimum injection concentration, light intensity, a contact time, and a characteristic for each water quality factor. Furthermore, system performance can be maintained with high efficiency for a long time by making, as a manual, timing at which an individual unit element system is controlled, maintained and managed for each processing target material.

In step 312, the purified water is introduced into the solar water electrolysis unit. Hydrogen is generated through water electrolysis by using energy generated by the sunlight collector, and is then purified and stored.

The purified water is introduced into the solar water electrolysis unit and subjected to water electrolysis, thereby generating clean hydrogen. The water electrolysis process is efficiently performed using solar thermal energy collected by the sunlight collector. Hydrogen using solar thermal energy and water through the water electrolysis device is converted into high-purity clean hydrogen through a purification process in the hydrogen purification device, and is stored in the hydrogen storage tank. Thereafter, a given amount of hydrogen is periodically injected into the energy production and storage unit through the automatic control device. Upon water electrolysis, required power versus solar power generation efficiency is efficiently performed through the automatic control device by analyzing the required power versus solar power generation efficiency.

In step 313, the stored hydrogen is injected into the energy production and storage unit. Energy is generated through the fuel cell by using energy generated by the sunlight collector. The produced energy is stored in the energy storage device. The stored energy is used to additionally supply sufficient power to the water electrolysis device.

The hydrogen injected into the energy production and storage unit is converted into energy through the fuel cell. The produced energy and the energy generated by the sunlight collector are transferred to the battery management system (BMS). An optimum energy production and storage process is performed through interoperation between the BMS and the automatic control device. Power generated through a stack of the fuel cells is stored in the energy storage device, and may be used as emergency power.

The energy production and storage unit may evaluate, through a panel, a storage state of dump power produced through the fuel cell, and adopts a bidirectional power conditioning system (PCS) for converting, into AC, power produced as DC and storing the AC.

The energy production and storage unit may recover hydrogen left after the hydrogen is converted into the energy through the fuel cell by using the energy generated by the sunlight collector, may purify the recovered hydrogen through the hydrogen purification device, and may inject the purified hydrogen into the fuel cell again. Such a fuel cell may have a dual engine structure in which a plurality of fuel cells is connected in parallel. The energy storage device may have a charging/discharging switching structure in order to enhance lifespan.

According to an embodiment of the present disclosure, the self-contained hydrogen generation unit can be monitored through a mobile or a web, and can enable remote machine control, including the supply of water, the adjustment of a water level in the reserve tank, and the adjustment of an electrolyte concentration for water electrolysis, based on a result of the monitoring. Furthermore, power of the self-contained hydrogen generation unit can be remotely controlled in order to increase the lifespan of the battery and to be operated by introducing external power when the driving of water electrolysis is stopped, when the driving of a fuel cell is stopped or when self-power production is stopped.

In step 320, the farm environment control unit receives energy for driving the plurality of sensors and devices for producing aquatic products from the self-contained hydrogen generation unit, and controls an environment for producing aquatic products.

Energy for driving the plurality of sensors, the camera and devices for producing aquatic products, for example the intelligent auto-feed supplier, the breeding environment controller, the net cleaner, the farm environment measurement sensor, the fish body measurement sensor, the CCTV image managing device is received from the self-contained hydrogen generation unit. An environment for producing aquatic products is controlled using the energy. Furthermore, oxygen left after hydrogen is produced through water electrolysis in the self-contained hydrogen generation unit is supplied to the smart farm in order to increase the amount of dissolved oxygen, and a filter comprising carbon and zeolite is attached to an oxygen outlet in order to remove harmful gas.

In a space for producing aquatic products according to an embodiment of the present disclosure, a smart farm can be operated in a self-contained manner anywhere in an isolated region and a rural area where power supply is not smooth by driving the farm environment control unit by using power supplied through a self-contained hydrogen generation unit.

The farm environment control unit monitors the farming environment by using the plurality of sensors and the camera, and controls a smart farm environment for producing aquatic products based on the monitored farming environment.

The farming environment measured by the plurality of sensors is monitored through a mobile or a web. The supply of water, the adjustment of a water level in the reserve tank, and the adjustment of an electrolyte concentration for water electrolysis by the self-contained hydrogen generation unit can be controlled based on a result of the monitoring. Furthermore, intelligent auto-feed supply, a breeding environment, the cleaning of a net, a farm environment, the measurement of a fish body, and the management of CCTV images in the farming environment can be controlled. Such control can be manually performed by displaying a monitored result on a display or can be performed through remote machine control through a mobile or a web.

Figure 4:
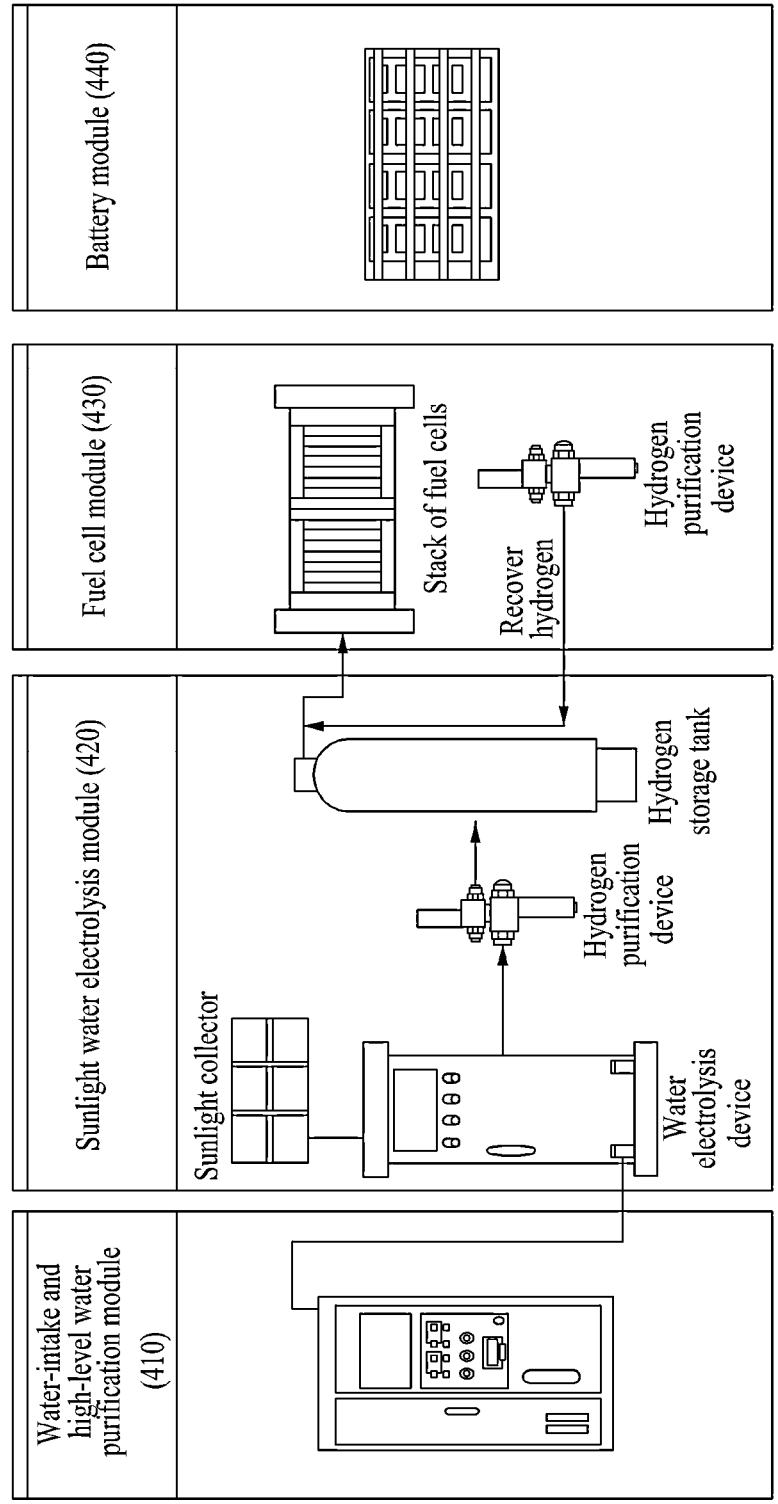
FIG. 4 is a diagram illustrating a configuration of a modulated self-contained hydrogen generation unit according to an embodiment of the present disclosure.

FIG. 4 is a diagram illustrating a configuration of a modulated self-contained hydrogen generation unit according to an embodiment of the present disclosure.

As described above, the self-contained hydrogen generation unit according to an embodiment of the present disclosure includes the water-intake and high-level water purification unit, the solar water electrolysis unit and the energy production and storage unit. In the present disclosure, the self-contained hydrogen generation unit may be modulated into a water-intake and high-level water purification module 410, a sunlight water electrolysis module 420, a fuel cell module 430, and a battery module 440 for each component. Coupling is easy, a defect can be easily detected, and maintenance and repair can be easily performed through the machine control system and the modulation of the power control system. Furthermore, power can be supplied to a place where power is necessary due to a movement by designing a movable self-contained hydrogen generation unit through modulation for each component.

Figure 5:
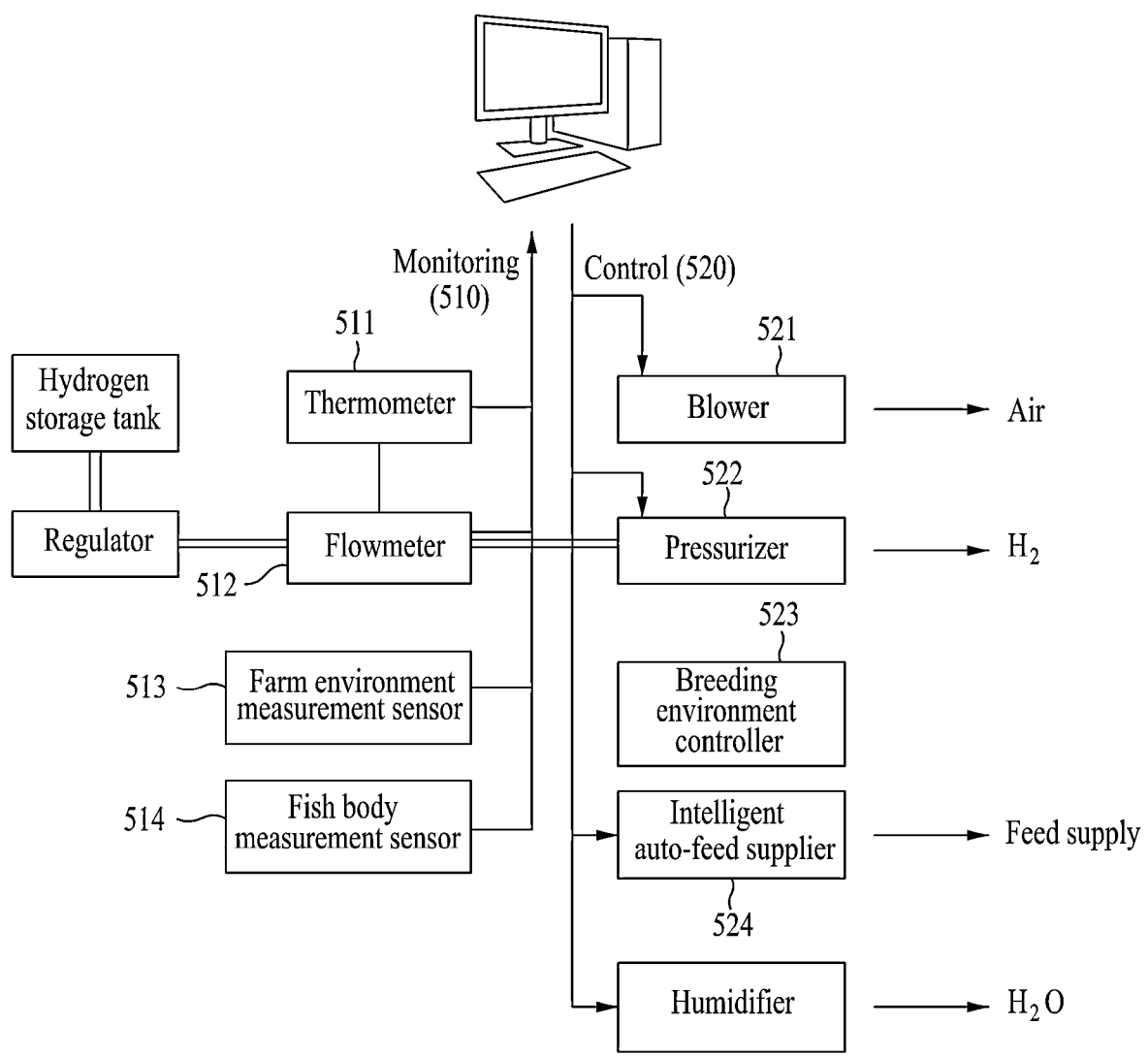
FIG. 5 is a diagram for describing remote machine control according to an embodiment of the present disclosure.

FIG. 5 is a diagram for describing remote machine control according to an embodiment of the present disclosure.

A farming environment measured by the plurality of sensors can be monitored through a mobile or a web. The supply of water, the adjustment of a water level in the reserve tank, and the adjustment of an electrolyte concentration for water electrolysis by the self-contained hydrogen generation unit can be controlled based on a result of the monitoring. Furthermore, the adjustment of a temperature and humidity, the management of a ground component, the supply and adjustment of a nutrient solution, the adjustment of a $CO_2$ concentration, and watering in a farming environment can be controlled. Such control can be manually performed by displaying a monitored result on a display or can be performed through remote machine control through a mobile or a web.

As illustrated in FIG. 5, a farming environment is monitored through a mobile or a web (510). The supply of water, the adjustment of a water level in the reserve tank, and the adjustment of an electrolyte concentration for water electrolysis by the self-contained hydrogen generation unit may be controlled based on a result of the monitoring (520). For example, the monitoring is performed (510) using a thermometer 511, a flowmeter 512, a farm environment measurement sensor 513 and a fish body measurement sensor 514.

For example, hydrogen and air (i.e., oxygen) may be supplied to a stack of fuel cells through a blower 521 based on a result of the monitoring.

The amount of hydrogen may be controlled using a pressurizer 522 based on a result of monitoring using the thermometer 511 and the flowmeter 512.

Furthermore, a breeding environment of the farm may be controlled using a breeding environment controller 523 depending on an environment measured by the farm environment measurement sensor 513. Proper food may be supplied using an intelligent auto-feed supplier 524 for the supply of the food based on fish body information measured by the fish body measurement sensor 514. Furthermore, the amount of $H_2O$ may be adjusted by a humidifier.

In other words, a supply device for supplying hydrogen fuel and air (or oxygen) to the fuel cell, a device for association with a water-intake unit system for supplying electrolyte to ultrapure water, etc. may be remotely controlled and monitored through a mobile or a web.

More specifically, water may be automatically supplied through an internal pump from river water or plumbing fixtures in a building. A level of internal water may be adjusted by a water level adjustment sensor of the internal water tank. Furthermore, electrolyte may be automatically supplied through an electrolyte concentration measurement sensor. A proper concentration may be maintained in water electrolysis. A stirring system may be disposed within the water tank and designed to make uniform a concentration of the electrolyte. When power supplied to the fuel cell is blocked, the leakage of hydrogen gas can be prevented by remotely blocking water electrolysis, a hydrogen tank valve and a power source.

Figure 6:
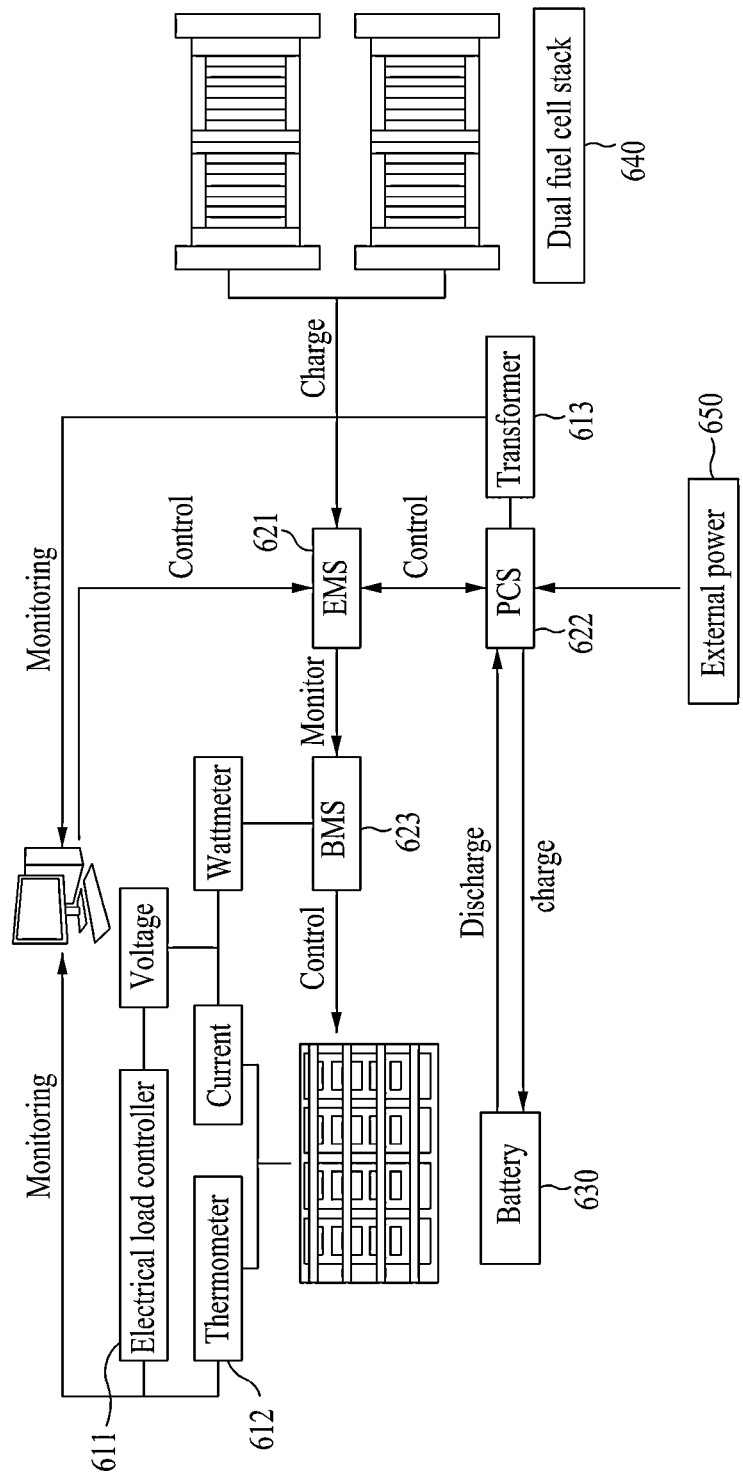
FIG. 6 is a diagram for describing remote power control according to an embodiment of the present disclosure.

FIG. 6 is a diagram for describing remote power control according to an embodiment of the present disclosure.

According to an embodiment of the present disclosure, the fuel cell may have a dual fuel cell stack 640 in which a plurality of fuel cells is connected in parallel, and may have a charging/discharging switching structure in order to enhance lifespan of the energy storage device.

An energy production and storage unit (i.e., a battery 630) is controlled and monitored by a BMS 623 and an EMS 621. A current and voltage of the energy production and storage unit are measured by a wattmeter. A state of the battery may be remotely monitored through a thermometer 612 and an electrical load controller 611.

Power control for associating, with the power system, electrical energy generated by the dual fuel cell stack 640 may be remotely controlled and monitored through a mobile or a web. The dual fuel cell stack 640 may be designed so that two fuel cells are connected in parallel and generate power although one fuel cell becomes off.

Furthermore, the lifespan of the battery 630 can be increased by applying a charging/discharging switching system to the battery. A charging battery and a discharging battery are fixed. When the charging of the charging battery is completed, the discharging battery is turned on and prevents overcharging. A bidirectional power conditioning system (PCS) 622 for converting, into AC, power produced as DC and storing the AC is applied, and may monitor a state of the battery through a transformer 613.

When the driving of the fuel cell and water electrolysis is stopped or when self-power production is stopped, the system can be operated by introducing external power 650.

Figure 7:
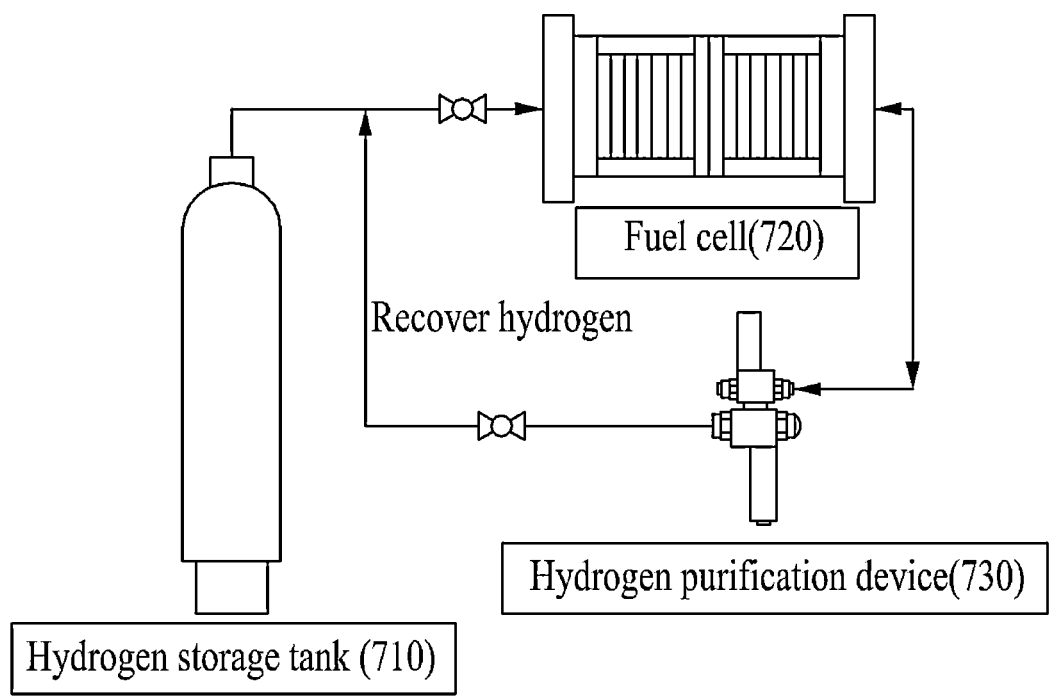
FIG. 7 is a diagram for describing a process of recovering and reusing hydrogen according to an embodiment of the present disclosure.

FIG. 7 is a diagram for describing a process of recovering and reusing hydrogen according to an embodiment of the present disclosure.

According to an embodiment of the present disclosure, hydrogen supplied by a hydrogen storage tank 710 is converted into energy through a fuel cell 720 by using energy generated by the sunlight collector. In this case, hydrogen left after the hydrogen is converted into the energy may be recovered, may be purified through a hydrogen purification device 730, and may be injected into the fuel cell 720 in order to reuse the hydrogen.

The aforementioned device may be implemented by a hardware component, a software component or a combination of a hardware component and a software component. For example, the device and components described in the embodiments may be implemented using one or more general-purpose computers or special-purpose computers, like a processor, a controller, an arithmetic logic unit (ALU), a digital signal processor, a microcomputer, a field programmable gate array (FPGA), a programmable logic unit (PLU), a microprocessor or any other device capable of executing or responding to an instruction. The processing device may perform an operating system (OS) and one or more software applications executed on the OS. Furthermore, the processing device may access, store, manipulate, process and generate data in response to the execution of software. For convenience of understanding, one processing device has been illustrated as being used, but a person having ordinary skill in the art may understand that the processing device may include a plurality of processing elements and/or a plurality of types of processing elements. For example, the processing device may include a plurality of processors or a single processor and a single controller. Furthermore, a different processing configuration, such as a parallel processor, is also possible.

Software may include a computer program, a code, an instruction or a combination of one or more of them and may configure a processing device so that the processing device operates as desired or may instruct the processing devices independently or collectively. The software and/or the data may be embodied in any type of machine, component, physical device, virtual equipment or computer storage medium or device in order to be interpreted by the processor or to provide an instruction or data to the processing device. The software may be distributed to computer systems connected over a network and may be stored or executed in a distributed manner. The software and the data may be stored in one or more computer-readable recording media.

The method according to an embodiment may be implemented in the form of a program instruction executable by various computer means and stored in a computer-readable medium. The computer-readable medium may include a program instruction, a data file, and a data structure solely or in combination. The medium may continue to store a program executable by a computer or may temporarily store the program for execution or download. Furthermore, the medium may be various recording means or storage means of a form in which one or a plurality of pieces of hardware has been combined. The medium is not limited to a medium directly connected to a computer system, but may be one distributed over a network. An example of the medium may be one configured to store program instructions, including magnetic media such as a hard disk, a floppy disk and a magnetic tape, optical media such as CD-ROM and a DVD, magneto-optical media such as a floptical disk, ROM, RAM, and flash memory. Furthermore, other examples of the medium may include an app store in which apps are distributed, a site in which other various pieces of software are supplied or distributed, and recording media and/or storage media managed in a server. Examples of the program instruction may include machine-language code, such as a code written by a compiler, and a high-level language code executable by a computer using an interpreter.

As described above, although the embodiments have been described in connection with the limited embodiments and drawings, those skilled in the art may modify and change the embodiments in various ways from the description. For example, proper results may be achieved although the above descriptions are performed in order different from that of the described method and/or the aforementioned components, such as the system, structure, device or apparatus, and circuit, are coupled or combined in a form different from that of the described method or replaced or substituted with other components or equivalents.

Accordingly, other implementations, other embodiments, and the equivalents of the claims fall within the scope of the claims.

The embodiments of the invention in which an exclusive property or privilege is claimed are defined as follows:

1. A system for managing a smart farm comprising:
   a self-contained hydrogen generation unit configured to purify intake-water, generate clean hydrogen through water electrolysis, generate energy through a fuel cell by using the generated clean hydrogen, and store the energy; and
   a farm environment control unit configured to receive, from the self-contained hydrogen generation unit, energy for driving a plurality of sensors and devices for producing aquatic products and control a smart farm environment for producing aquatic products, wherein:
     the farm environment control unit monitors the smart farm environment through the plurality of sensors and to control the smart farm environment for producing aquatic products by using a plurality of devices, comprising an intelligent auto-feed supplier, a breeding environment controller, a net cleaner, a farm environment measurement sensor, a fish body measurement sensor, and a CCTV image managing device, based on the monitored farming environment;
     oxygen left after hydrogen is produced through water electrolysis in the self-contained hydrogen generation unit is supplied to the smart farm in order to increase the amount of dissolved oxygen; and
     a filter comprising carbon and zeolite is attached to an oxygen outlet in order to remove harmful gas.

2. The system of claim 1, wherein the self-contained hydrogen generation unit comprises:
   a water-intake and high-level water purification unit configured to retain the intake-water in a water reserve tank and perform water treatment on the intake-water by removing precipitates;
   a solar water electrolysis unit configured to receive the purified water, generate hydrogen through water electrolysis by using energy generated by a sunlight collector, and then purify and store the generated hydrogen; and
   an energy production and storage unit configured to receive the stored hydrogen, generate energy through the fuel cell by using the energy generated by the sunlight collector, and store the produced energy in an energy storage device, wherein the stored energy is also used to supply power to a solar water electrolysis unit.

3. The system of claim 2, wherein the self-contained hydrogen generation unit and the farm environment control unit are monitored through a mobile or a web and perform remote machine control, comprising supply of water, adjustment of a water level in the reserve tank, adjustment of an electrolyte concentration for water electrolysis, intelligent auto-feed supply, control of a breeding environment, cleaning of a net, control of the smart farm environment, measurement of a fish body, and management of CCTV images, based on a result of the monitoring, and perform remote power control in order to increase lifespan of the energy production and storage unit and for an operation using external power when driving of water electrolysis through the fuel cell is stopped or when self-power production is stopped, control water electrolysis to be remotely performed when supply of power from the fuel cell is blocked, and prevent leakage of hydrogen gas by blocking a valve of a hydrogen tank and power.

4. The system of claim 2, wherein:
   the energy production and storage unit recovers hydrogen left after the hydrogen is converted into the energy through the fuel cell by using the energy generated by the sunlight collector and injects the recovered hydrogen into the fuel cell again through the hydrogen purification device,
   the fuel cell has a dual engine structure in which a plurality of fuel cells is connected in parallel and has a charging/discharging switching structure in order to enhance lifespan of the energy storage device, and
   the water-intake and high-level water purification unit supplies the water-treated water as drinking water.

5. A method of managing a smart farm, comprising steps of:
   purifying, by a self-contained hydrogen generation unit, intake-water, generating clean hydrogen through water electrolysis, generating energy through a fuel cell by using the generated clean hydrogen, and storing the energy; and
   receiving, by a farm environment control unit, energy for driving a plurality of sensors and devices for producing aquatic products from the self-contained hydrogen generation unit and controlling a smart farm environment for producing aquatic products, wherein:
     the step of receiving, by a farm environment control unit, energy for driving a plurality of sensors and devices for producing aquatic products from the self-contained hydrogen generation unit and controlling an smart farm environment for producing aquatic products comprises: monitoring, by the farm environment control unit, a smart farm environment through the plurality of sensors and controlling the smart farm environment for producing aquatic products by using a plurality of devices, comprising an intelligent auto-feed supplier, a breeding environment controller, a net cleaner, a farm environment measurement sensor, a fish body measurement sensor, and a CCTV image managing device, based on the monitored farming environment;

oxygen left after hydrogen is produced through water electrolysis in the self-contained hydrogen generation unit is supplied to the smart farm in order to increase the amount of dissolved oxygen; and a filter comprising carbon and zeolite is attached to an oxygen outlet in order to remove harmful gas.

6. The method of claim 5, wherein the step of purifying, by a self-contained hydrogen generation unit, intake-water, generating clean hydrogen through water electrolysis, generating energy through a fuel cell by using the generated clean hydrogen, and storing the energy comprises steps of:

retaining, by a water-intake and high-level water purification unit, the intake-water in a water reserve tank and performing water treatment on the intake-water by removing precipitates;

receiving, by a solar water electrolysis unit, the purified water, generating hydrogen through water electrolysis by using energy generated by a sunlight collector, and then purifying and storing the generated hydrogen; and receiving, by an energy production and storage unit, the stored hydrogen, generating energy through the fuel cell by using the energy generated by the sunlight collector, and storing the produced energy in an energy storage device.

7. The method of claim 6, wherein:

the self-contained hydrogen generation unit and the farm environment control unit are monitored through a mobile or a web, perform remote machine control, comprising supply of water, adjustment of a water level in the reserve tank, adjustment of an electrolyte concentration for water electrolysis, intelligent auto-feed supply, control of a breeding environment, cleaning of a net, control of the smart farm environment, measurement of a fish body, and management of CCTV images, based on a result of the monitoring, and perform remote power control in order to increase lifespan of the energy production and storage unit and for an operation using external power when driving of water electrolysis through the fuel cell is stopped or when self-power production is stopped, control water electrolysis to be remotely performed when supply of power from the fuel cell is blocked, and prevent leakage of hydrogen gas by blocking a valve of a hydrogen tank and power.

8. The method of claim 6, wherein:

the step of purifying, by a self-contained hydrogen generation unit, intake-water, generating clean hydrogen through water electrolysis, generating energy through a fuel cell by using the generated clean hydrogen, and storing the energy comprises a step of recovering, by the energy production and storage unit, hydrogen left after the hydrogen is converted into the energy through the fuel cell by using the energy generated by the sunlight collector and to inject the recovered hydrogen into the fuel cell again through the hydrogen purification device, and the step of retaining, by a water-intake and high-level water purification unit, the intake-water in a water reserve tank and performing water treatment on the intake-water by removing precipitates comprises supplying the water-treated water as drinking water.

\* \* \* \* \*